United States Patent
Chen

(12) 
(10) Patent No.: US 7,555,643 B2
(45) Date of Patent: Jun. 30, 2009

(54) METHOD FOR EXPRESS EXECUTION OF COMPUTER FUNCTION OPTIONS BY LOADING PROGRAM IMAGE FILE

(75) Inventor: Chiu-Fu Chen, Sanchong (TW)

(73) Assignee: Mitac Technology Corp., Hsinchu (TW)

( * ) Notice: Subject to any disclaimer, the term of this patent is extended or adjusted under 35 U.S.C. 154(b) by 436 days.

(21) Appl. No.: 11/368,500

(22) Filed: Mar. 7, 2006

(65) Prior Publication Data

US 2007/0067616 A1    Mar. 22, 2007

(30) Foreign Application Priority Data

Sep. 16, 2005    (TW) .............................. 94132162 A

(51) Int. Cl.
*G06F 9/00* (2006.01)
*G06F 15/177* (2006.01)
(52) U.S. Cl. .......................................... 713/2; 713/100
(58) Field of Classification Search ...................... 713/2, 713/100
See application file for complete search history.

(56) References Cited

U.S. PATENT DOCUMENTS 5,555,098 A * 9/1996 Parulski ..................... 386/104
7,032,053 B2    4/2006 Himmel et al.
7,228,408 B2 * 6/2007 Wu et al. ....................... 713/1
2004/0006690 A1 * 1/2004 Du et al. ....................... 713/2
2005/0038932 A1 * 2/2005 Himmel et al. ............... 710/15

FOREIGN PATENT DOCUMENTS

| CN | 1484143 | 3/2004 |
| CN | 1581082 | 2/2005 |
| EP | 1460536 | 9/2004 |
| TW | 588284  | 5/2004 |

OTHER PUBLICATIONS

Communication from the German Patent Office dated Mar. 27, 2008.

* cited by examiner

*Primary Examiner*—Mark Connolly
*Assistant Examiner*—Stefan Stoynov
(74) *Attorney, Agent, or Firm*—Quintero Law Office

(57) ABSTRACT

A method for fast activating a computer function options by loading program image files is provided, including a data storage pre-installed with at least a program image file. When the user operates an option button, the computer loads and executes the program image file associated with the option button after the basic booting process of the operating system. This activates the multimedia device corresponding to the pressed option button. In the preferred embodiment, the data storage also stores a program image file index in addition to the program image files. The program file index stores the starting addresses and file size of all the program image files.

13 Claims, 7 Drawing Sheets

| Option Button | Activated Multimedia Device | Program Image File |
|---|---|---|
| | | Program Image File |
| Option Button(21) | CD Player(3a) | Program Image File#1(AP1) |
| Option Button(22) | Digital Music Device (3b) | Program Image File#2(AP2) |
| Option Button(23) | VCD Player(3c) | Program Image File#3(AP3) |
| Option Button(24) | TV Signal Receive(3d) | Program Image File#4(AP4) |

FIG.3

METHOD FOR EXPRESS EXECUTION OF COMPUTER FUNCTION OPTIONS BY LOADING PROGRAM IMAGE FILE

FIELD OF THE INVENTION

The present invention relates to a method for booting a computer system and, more particularly, to a method for express execution of computer function options by loading an image file of a program.

BACKGROUND OF THE INVENTION

Because of the rapid development of computer technology, the multimedia playing system made with the integration of a computer system and an audiovisual player is gaining popularity and is widely used on many occasions, including offices and households. Similarly, computers integrated with intelligent appliances (IA) are also widely available in the product market.

Conventional multimedia playing system is basically interfacing a computer system with an audiovisual player. Thus, the user usually needs to boot the computer system up in order to activate and operate the audiovisual player. In other words, the user must wait until the computer system completes the BIOS program initialization, POST program, peripheral detection and driving, OS activation, system state setting, and so on, before the user can execute the audiovisual program to play the audiovisual data. It is inconvenient for the user as there is no shortcut to bypass the tedious booting process of the computer system.

The aforementioned drawback deters the computer-based multimedia system from behaving like a household appliance with a quick activation/booting process. If the computer-based multimedia system allows the user to switch among various function options like a household appliance, the ease of use will be a value-added feature to the computer.

As the computer provides many functions and yet most computer users usually use one or few computer functions at a time, such as music listening, TV watching, movie watching, it is a waste of time for the user to wait for the computer system to execute the initialization of all the hardware before they can use the intended function.

SUMMARY OF THE INVENTION

The present invention is made to overcome the aforementioned drawbacks of the conventional technology by providing a method for booting a computer-based multimedia system. The present invention allows a user to execute an application program by extracting an image file of that application program. Therefore, the conventional booting of the computer system, including BIOS, POST, and initialization can be omitted but the user is still allowed to choose among the function options by activating the image file of the program.

Another object of the present invention is to provide a method for fast activating a computer function options by loading program image files. The application programs of the computer are stored as the image files in the pre-determined memory address of the hard disk so that the user can quickly extract and execute the program image file when operating the function options.

A further object of the present invention is to provide a method for fast booting and execution of computer function options. The hard disk of the computer stores the program image files so that the execution of the program image files can be faster with the program image file index and the associated parameter files.

To achieve the aforementioned objects, the present invention provides a method comprising a data storage pre-installed with at least a program image file. When a user depresses and operates an option button, the computer loads and executes the program image file associated with the option button after the basic booting process of the operating system. This activates the multimedia device corresponding to the depressed option button.

In a preferred embodiment, the data storage also stores a program image file index in addition to the program image files. The program file index stores starting addresses and file sizes of all the program image files. Furthermore, the data storage can also include at least an associated parameter file. Each associated parameter file corresponds to a program image file for storing the parameters set by the user when the program image file is executed.

In comparison with the conventional methods, the present invention allows the computer to omit the conventional booting of a computer system, such as BIOS, POST, initialization, and so on, when detecting the user selecting a function option. Instead, the computer extracts the pre-installed program image file from the hard disk for execution in order to speed up the activation of the application program. In actual application, the present invention can stores image files of application programs for CD, digital music device, VCD, TV, and so on in the hard disk for fast extraction and activation. The present invention can further store associated parameters of each application program to improve the convenience of using the application programs.

These and other objects, features and advantages of the invention will be apparent to those skilled in the art, from a reading of the following brief description of the drawings, the detailed description of the preferred embodiment, and the appended claims.

BRIEF DESCRIPTION OF THE DRAWINGS

The present invention can be understood in more detail by reading the subsequent detailed description in conjunction with the examples and references made to the accompanying drawings, wherein:

FIG. 3 shows the correspondence between option buttons and multimedia device with program image file;

DETAILED DESCRIPTION OF THE PREFERRED EMBODIMENTS

Figure 1:
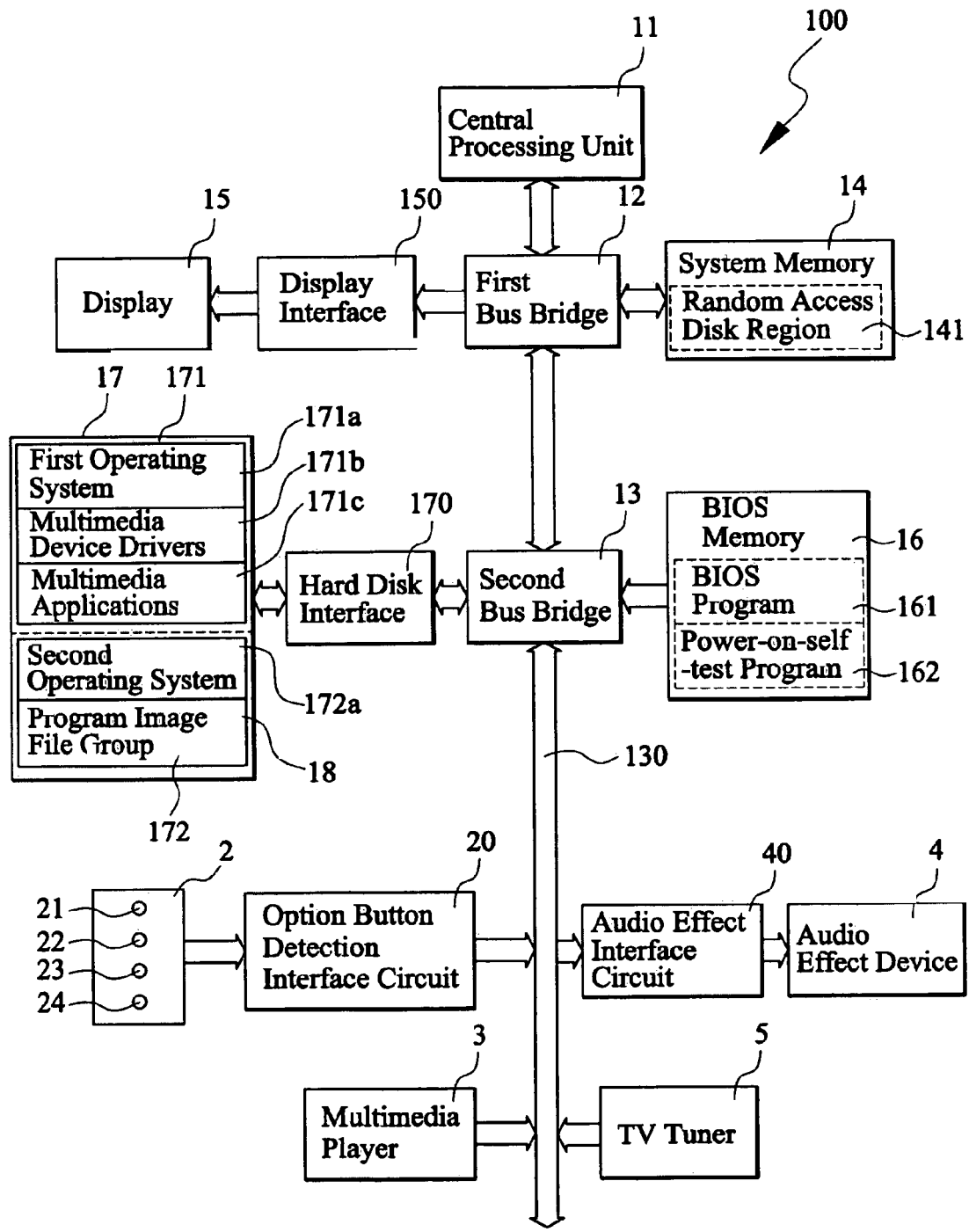
FIG. 1 shows a functional block diagram of a first embodiment of the present invention.

With reference to the drawings and in particular to FIG. 1, which shows a functional block diagram of a first embodiment of the present invention, in the embodiment, a computer 100 comprises a central processing unit (CPU 11), a first bus bridge 12, and a second bus bridge 13. The CPU 11 is connected to the first bus bridge 12 through a system bus. The first bus bridge 12 is connected to a system memory 14, and connected to a display through a display interface 150.

The second bus bridge 13 is connected to a BIOS memory 16. The BIOS memory 16 stores a BIOS program 161 and a power-on-self-test (POST) program 162, required by the computer 100 during the booting process.

The second bus bridge 13 is connected to a hard disk interface 170 through a bus. The hard disk interface 170 is connected to a hard disk 17. The hard disk 17 stores data in the present invention. The hard disk 17 is configured to include a first region 171 and a second region 172. The first region 171 is installed with an operating system 171a, such as Windows operating system. The first region 171 also stores various multimedia device drivers 171b and multimedia applications 171c working under the first operating system environment.

The second region 172 is installed with a second operating system 172a, such as Linux-based operating system, Tiny Windows-based operating system, or embedded operating system. The second region 172 also stores a program image file group 18.

Figure 2:
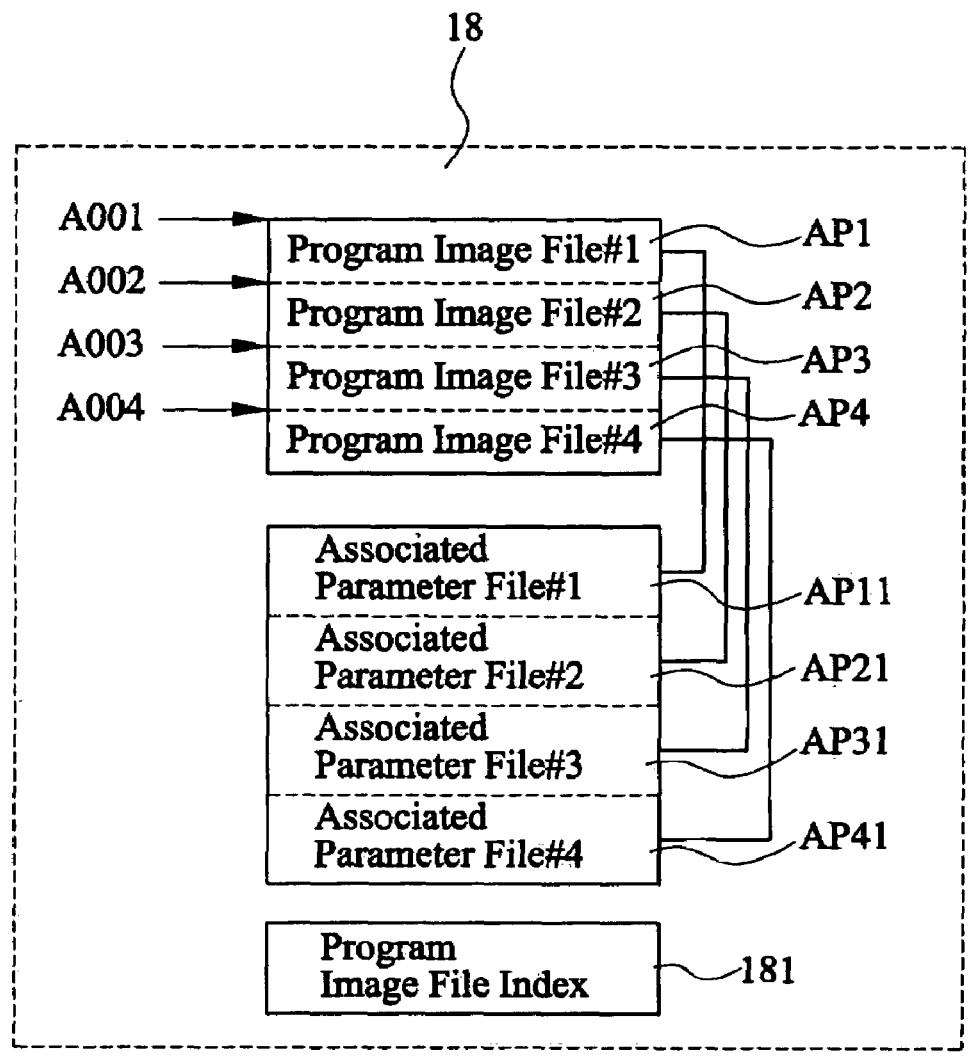
FIG. 2 shows a schematic view of a plurality of program image files in a program image file group of FIG. 1.

Also referring to FIG. 2, the program image file group 18 comprises a plurality of program image files AP1, AP2, AP3, and AP4. For example, the program image files AP1, AP2, AP3, and AP4 are the image files of the application programs for multimedia devices, such as, CD player, digital music device, VCD player, and TV signal receiver.

The program image files AP1, AP2, AP3, and AP4 have starting address A001, A002, A003, A004, respectively. A program image file index 181 records the starting addresses and the file sizes of the program image files.

The program image files AP1, AP2, AP3, AP4 are the image files of the application programs for the multimedia devices, such as CD player, digital music device, VCD player and TV signal receiver. The program image files AP1, AP2, AP3, AP4 are pre-installed in the second region 172 of the hard disk 17.

In addition, each program image file AP1, AP2, AP3, AP4 is associated with an associated parameter file AP11, AP21, AP31, AP41 for storing the parameter settings set by the user when using the application program, such as volume, sound quality, channel, and so on.

The second bus bridge 13 of the computer 100 is connected to an option button detection interface circuit 20 through a bus 130, and the option button detection interface circuit 20 is connected to an option button set 2. The option button set 2 includes a plurality of option buttons 21, 22, 23, 24, which, when operated by the user, activate CD player, digital music device, VCD player and TV. At the user's operation of the option button 21, 22, 23, 24, the corresponding program image file AP1, AP2, AP3, AP4 is loaded from the hard disk 17 and executed to activate the playing function of CD player, digital music device, VCD player or TV signal receiver.

FIG. 3 shows the correspondence between the option button 21, 22, 23, 24 and the activated multimedia device 3a, 3b, 3c, 3d with executed program image file AP1, AP2, AP3, AP4.

The option buttons 21, 22, 23, 24 can be buttons installed on the panel of the corresponding multimedia device or on the computer. Alternatively, the option buttons 21, 22, 23, 24 are specific keys on the keyboard of the computer. The specific keys can be decoded by a keyboard controller, and identified by the CPU.

Figure 4:
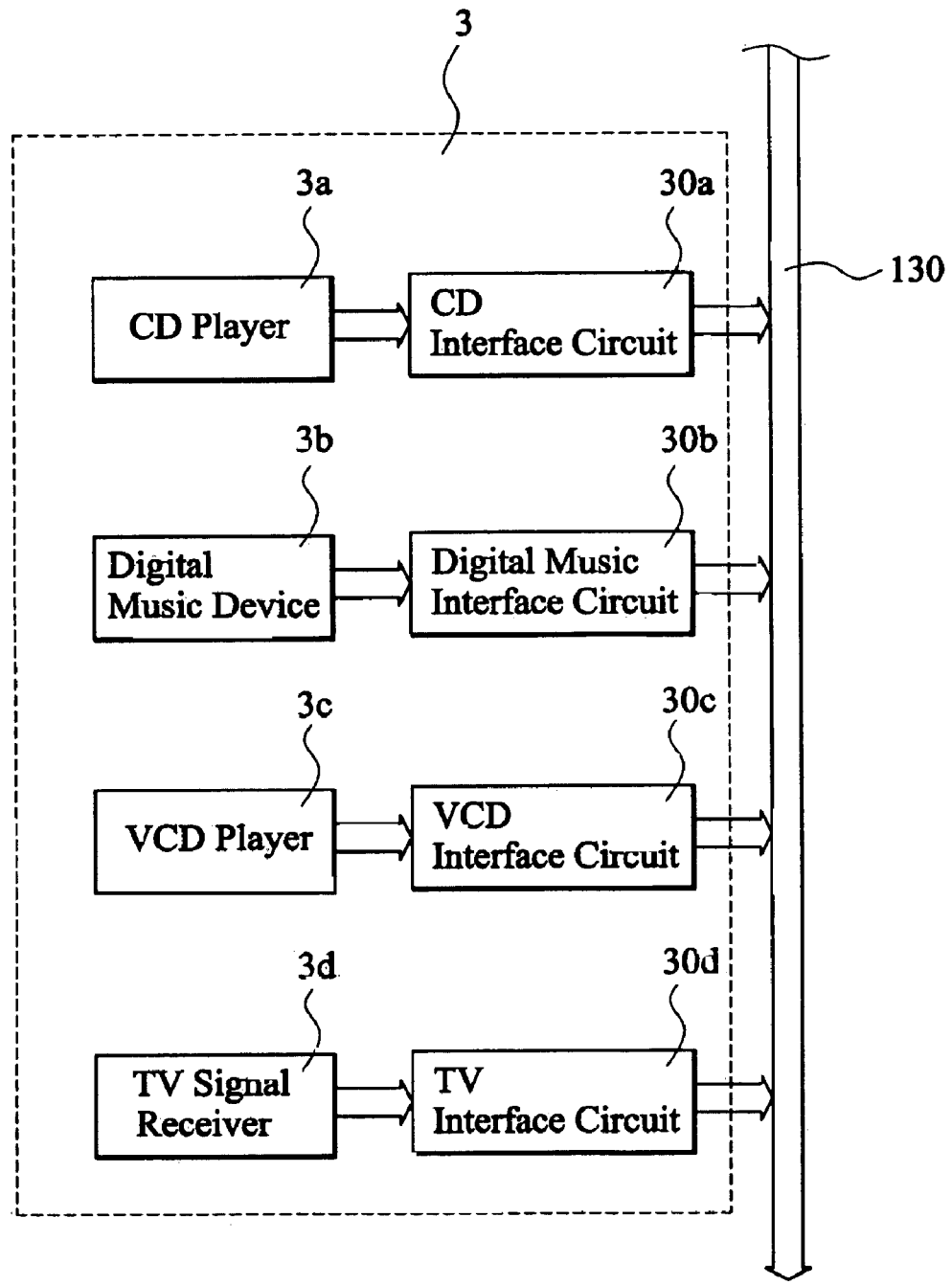
FIG. 4 shows a schematic view of the multimedia device of FIG. 1.

The second bus bridge 13 of the computer 100 is connected to a multimedia player 3 through the bus 130. FIG. 4 shows a schematic view of multimedia player 3. In the embodiment of the present invention, the multimedia player 3 comprises a CD player 3a, a digital music device 3b, a VCD player 3c, and a TV signal receiver 3d, all connected to the bus 130 through a CD interface circuit 30a, a digital music interface circuit 30b, a VCD interface circuit 30c, and a TV interface circuit 30d, respectively.

The second bus bridge 13 of the computer 100 is connected to an audio effect interface circuit 40 through the bus 130. The audio effect interface circuit 40 is connected to an audio effect device 4. The second bus bridge 13 of the computer 100 is also connected to a TV tuner 5 through the bus 130.

Figure 5:
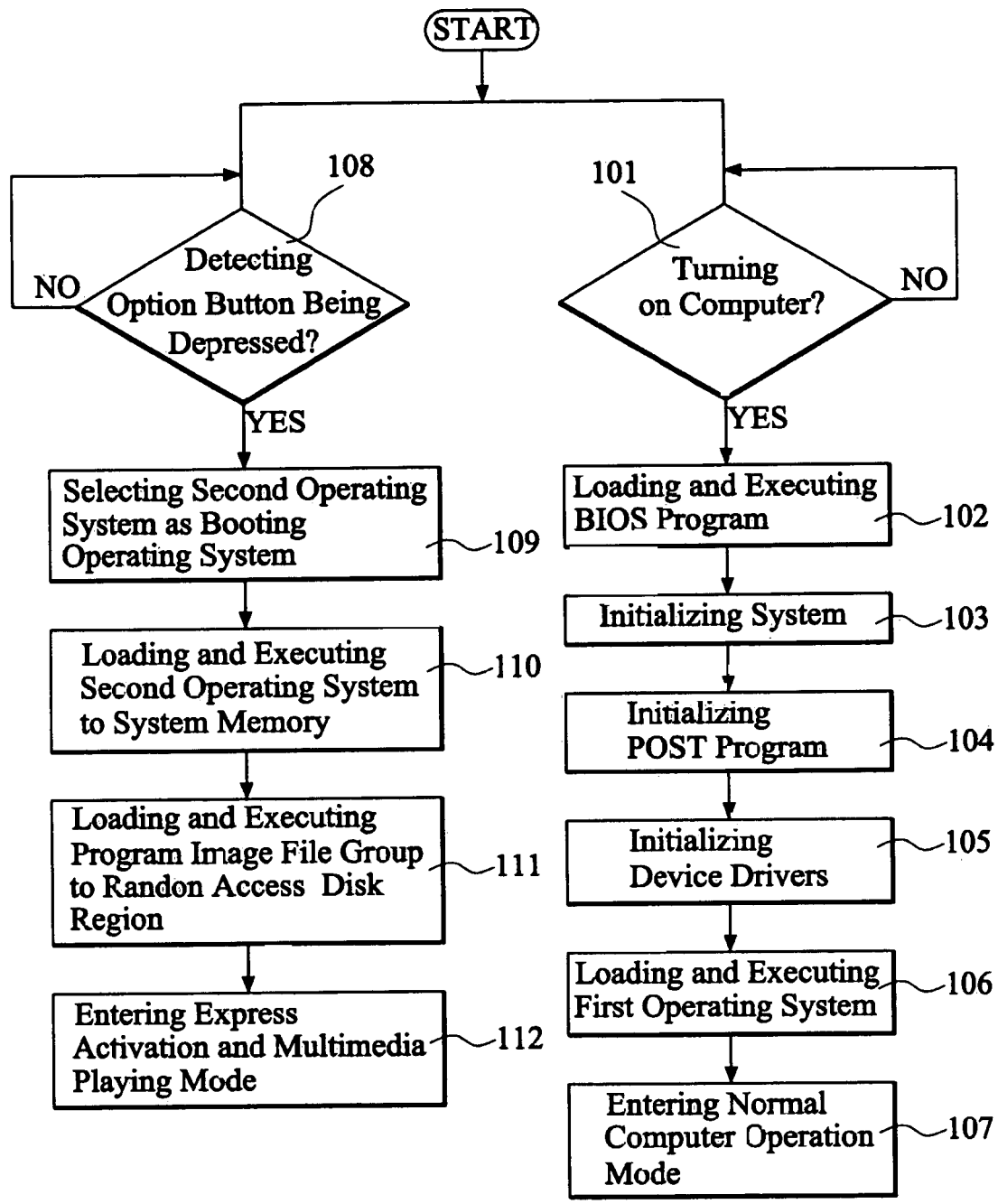
FIG. 5 shows a flowchart of the first embodiment of FIG. 1.

FIG. 5 shows a flowchart of the embodiment of FIG. 1. The following description of the flowchart refers to FIGS. 1-4.

The computer 100 of the present invention can operate in either normal computer operation mode or multimedia express activation and playing mode. In step 101, the computer 100 is turned on, and the computer 100 executes the basic booting process. That is, the computer 100 loads and executes the BIOS program 161 (step 102), the system initialization (step 103), the POST program 162 (step 104) from the BIOS memory 16, and the device drivers (step 105). After the computer 100 finishes the basic booting process, the computer 100 loads and executes the first operating system 171a (step 106) from the first region 171 of the hard disk 17, and enters the normal computer operation mode (step 107). At this point, the user can operate the computer 100 as a normal computer device.

When the user intends to perform multimedia playing function, the user only needs to depress any option button 21, 22, 23, 24 of the option button set 2 to activate the corresponding multimedia device, such as CD player, digital music device, VCD player or TV signal receiver. That is, when the computer 100 detects that any option button of the option button set 2 is depressed (step 108), the computer 100 selects the second operating system 172a in the second region 172 of the hard disk 17 as the booting operating system (step 109). Then, the second operating system 172a is loaded to the system memory 14 and executed (step 110).

When the computer 100 executes the second operating system 172a, only the kernel of the second operating system 172a is executed, instead of the entire booting process as with using the first operating system 171a, such as system initialization, POST, and so on. Then, the corresponding program image file AP1, AP2, AP3, AP4 of the program image file group 18 in the second region 172 of the hard disk 17 is loaded to a random access disk region 141 of the system memory 14 for execution (step 111). At this point, the computer 100 enters the express activation and multimedia playing mode. In this way, the user does not wait for the conventional tedious booting process to enter the normal computer operation mode before activating multimedia playing function.

In this embodiment, the hard disk 17 is divided into the first region 171 and the second region 172 for installing with the first operating system 171a and the second operating system 172a. Also, the program image files AP1, AP2, AP3, AP4 and the program image file index 181 are stored in the second region 172 of the hard disk 17. In another embodiment, the hard disk 17 only includes a single region, and the program image files AP1, AP2, AP3, AP4 and the program image file index 181 are all stored in that single region of the hard disk 17.

Figure 6:
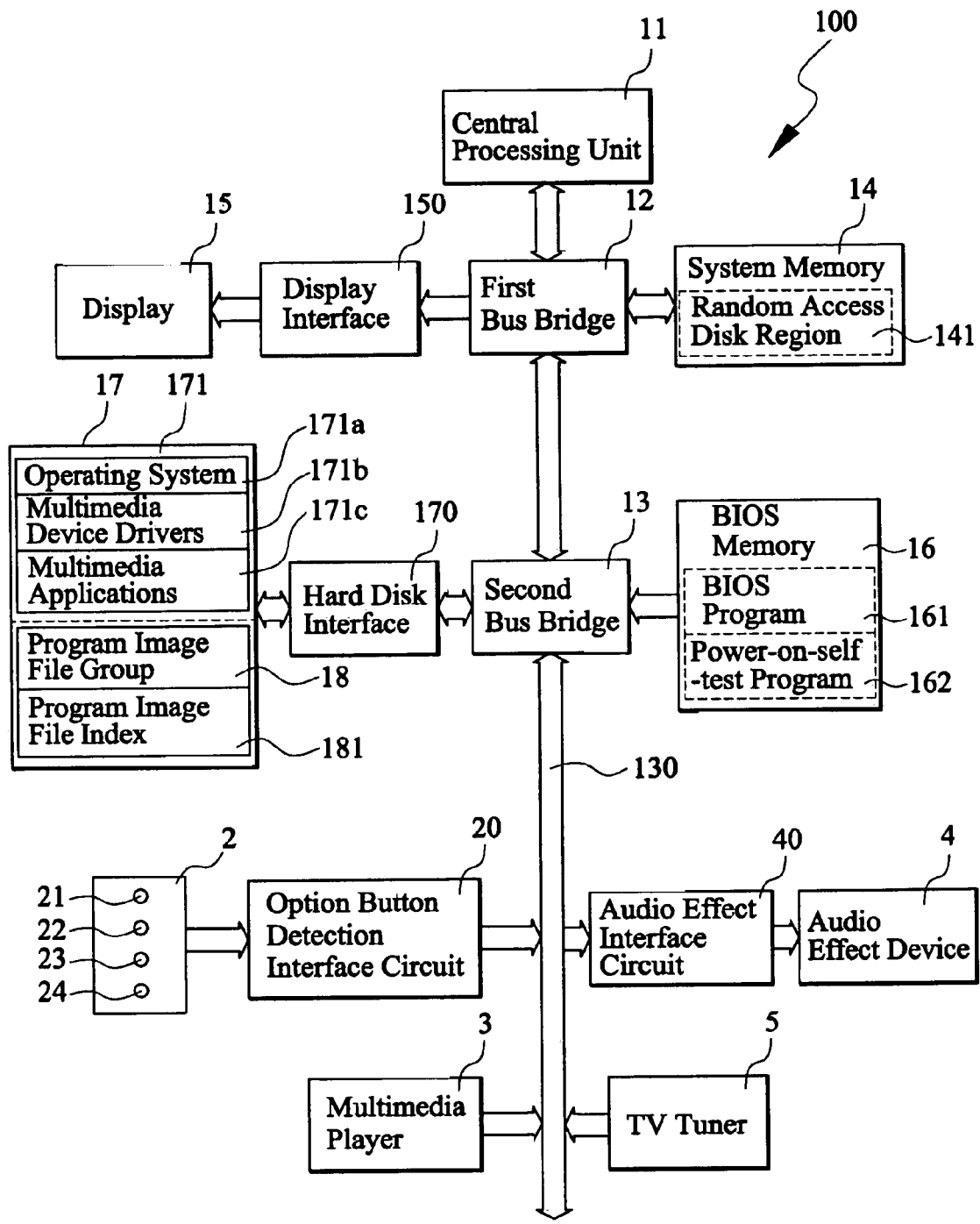
FIG. 6 shows a functional block diagram of a second embodiment of the present invention.

FIG. 6 shows a functional block diagram of a second embodiment of the present invention. This embodiment is similar to the first embodiment of FIG. 1, except that a hard disk 17 only includes a single region. The hard disk 17 is installed with an operating system 171a, all device drivers 171b, at least a multimedia application program 171c, a program image file group 18, and a program image file index 181.

Figure 7:
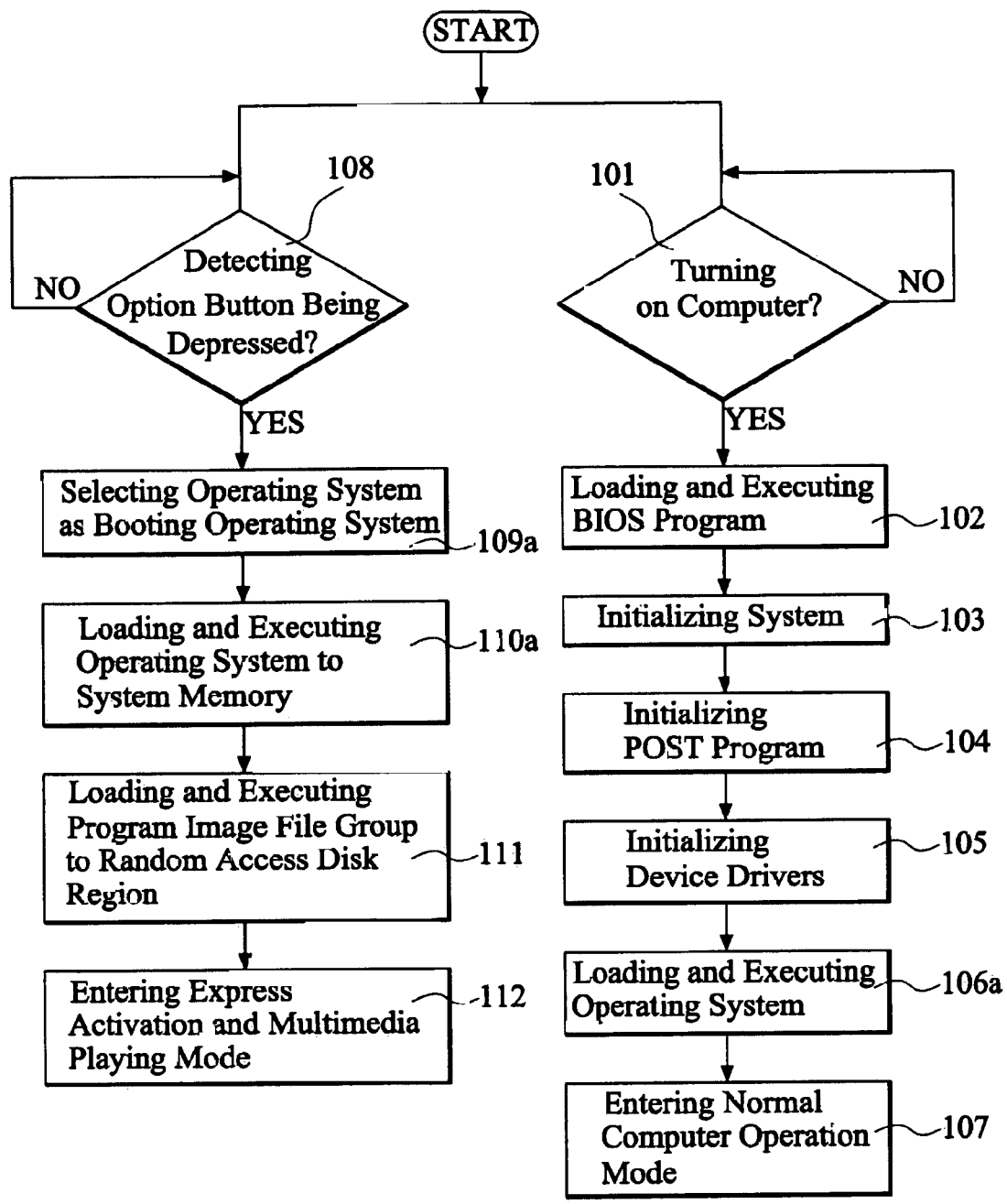
FIG. 7 shows a flowchart of the second embodiment of FIG. 6.

FIG. 7 shows the flowchart for the embodiment in FIG. 6. The flowchart is similar to the flowchart of FIG. 5, and the identical steps are designated with the same step number. In step 101, the computer 100 is turned on, and the computer 100 executes the basic booting process. That is, the computer 100 loads and executes the BIOS program 161 (step 102), the system initialization (step 103), the POST program 162 (step 104) from the BIOS memory 16, and the device drivers (step 105). After the computer 100 finishes the basic booting process, the computer 100 loads and executes the operating system 171a (step 106a) from the hard disk 17, and enters the normal computer operation mode (step 107). At this point, the user can operate the computer 100 as a normal computer device.

When the user intends to perform multimedia playing function, the user only needs to depress any option button 21, 22, 23, 24 of the option button set 2 to activate the corresponding multimedia device, such as CD player, digital music device, VCD player or TV signal receiver. That is, when the computer 100 detects that any option button of the option button set 2 is depressed (step 108), the computer 100 selects the operating system 171a in the hard disk 17 as the booting operating system (step 109a). Then, the operating system 171a is loaded to the system memory 14 and executed (step 110a).

When the computer 100 executes the operating system 171a, the system initialization, POST steps are omitted. Then, the corresponding program image file AP1, AP2, AP3, AP4 of the program image file group 18 in the hard disk 17 is loaded to the random access disk region 141 of the system memory 14 for execution (step 111). At this point, the computer 100 enters the express activation and multimedia playing mode. In this way, the user does not wait for the conventional tedious booting process to enter the normal computer operation mode before activating multimedia playing function.

While the invention has been described in connection with what is presently considered to the most practical and preferred embodiments, it is to be understood that the invention is not to be limited to the disclosed embodiment, but on the contrary, is intended to cover various modifications and equivalent arrangement included within the spirit and scope of the appended claims.

What is claimed is:

1. A method for express execution of computer function options by loading program image file for a computer-based multimedia system, a computer of the multimedia system having a CPU, a data storage, a system memory, a BIOS, at least a first device option button and a second device option button, and at least a first multimedia device and a second multimedia device, wherein the first device option button corresponds to the first multimedia device and the second device option button corresponds to the second multimedia device, the data storage storing a first operating system, a second operating system, at least a first program image file corresponding to the first device option button and a second program image file corresponding to the second device option button, the first program image file being an image file of application program of the first multimedia device and the second program image file being an image file of application program of the second multimedia device, the method comprising the steps of:
   (a) detecting the state of the multimedia device option button;
   (b) when detecting any option button is depressed, the computer loading and executing the second operating system for basic booting process;
   (c) after loading and executing the second operating system, loading and executing the program image file corresponding to the option button from the data storage to the system memory; and
   (d) activating the multimedia device associated with the depressed option button
   wherein the data storage further stores a program image file index for storing starting addresses and file sizes of the program image files.

2. The method as claimed in claim 1, wherein the data storage is a hard disk and the hard disk is divided into a first region and a second region for storing the first operating system and the second operating system, respectively.

3. The method as claimed in claim 2, wherein the second region stores the program image file.

4. The method as claimed in claim 1, wherein a step of determining whether the first operating system is used to boot the computer is further included before step (a).

5. The method as claimed in claim 1, wherein the program image file is an image file of application program for the multimedia device, including CD player, digital music device, VCD player or a TV signal receiver.

6. The method as claimed in claim 1, wherein the data storage further stores an associated parameter file for each application program for storing parameter settings set by the user when using the application program.

7. A method for express execution of computer function options by loading program image file for a computer-based multimedia system, a computer of the multimedia system having a CPU, a data storage, a system memory, a BIOS, at least a device option button, and at least a multimedia device, the data storage storing an operating system, at least a program image file corresponding to the device option button, the program image file being an image file of application program of the multimedia device, the method comprising the steps of:
   (a) detecting the state of the multimedia device option button;
   (b) when detecting any option button is depressed, the computer loading and executing the operating system for basic booting process;
   (c) after loading and executing the operating system, loading and executing the program image file corresponding to the option button from the data storage to the system memory; and
   (d) activating the multimedia device associated with the depressed option button;
   wherein the data storage further stores an associated parameter file for each application program for storing parameter settings set by the user when using the application program.

8. The method as claimed in claim 7, wherein the program image file is an image file of application program for the multimedia device, including CD player, digital music device, VCD player or a TV signal receiver.

9. A method for express execution of computer function options by loading program image file for a computer-based multimedia system, a computer of the multimedia system having a CPU, a data storage, a system memory, a BIOS, at least a device option button, and at least a multimedia device, the data storage storing a first operating system, a second operating system, at least a program image file corresponding to the device option button, the program image file being an image file of application program of the multimedia device, the method comprising the steps of:
   (a) detecting the state of the multimedia device option button;

(b) when detecting any option button is depressed, the computer loading and executing the second operating system for basic booting process;
(c) after loading and executing the second operating system, loading and executing the program image file corresponding to the option button from the data storage to the system memory; and
(d) activating the multimedia device associated with the depressed option button;
wherein the data storage further stores an associated parameter file for each application program for storing parameter settings set by the user when using the application program.

10. The method as claimed in claim 9, wherein the data storage is a hard disk and the hard disk is divided into a first region and a second region for storing the first operating system and the second operating system, respectively.

11. The method as claimed in claim 10, wherein the second region stores the program image file.

12. The method as claimed in claim 9, wherein a step of determining whether the first operating system is used to boot the computer is further included before step (a).

13. The method as claimed in claim 9, wherein the program image file is an image file of application program for the multimedia device, including CD player, digital music device, VCD player or a TV signal receiver.

* * * * *